US011010832B2

(12) United States Patent
Ardinger et al.

(10) Patent No.: US 11,010,832 B2
(45) Date of Patent: May 18, 2021

(54) LOAN AUDIT SYSTEM AND METHOD WITH CHAINED CONFIDENCE SCORING

(71) Applicant: KPMG LLP, New York, NY (US)

(72) Inventors: Matthew Thomas Ardinger, Ada, MI (US); Marisa Ferrara Boston, Ann Arbor, MI (US); Ryan John Temple, Caledonia, MI (US); Christopher Wicher, Raleigh, NC (US); Vishnu Muralidharan, Jersey City, NJ (US)

(73) Assignee: KPMG LLP, New York, NY (US)

( * ) Notice: Subject to any disclaimer, the term of this patent is extended or adjusted under 35 U.S.C. 154(b) by 159 days.

(21) Appl. No.: 15/977,636

(22) Filed: May 11, 2018

(65) Prior Publication Data

US 2019/0347718 A1   Nov. 14, 2019

(51) Int. Cl.
*G06Q 40/02*  (2012.01)
*G06F 40/20*  (2020.01)
*G06K 9/00*  (2006.01)
*G06F 40/284*  (2020.01)

(52) U.S. Cl.
CPC ......... *G06Q 40/025* (2013.01); *G06F 40/284* (2020.01); *G06K 9/00449* (2013.01); *G06K 9/00469* (2013.01)

(58) Field of Classification Search
CPC .................................................. G06Q 40/025
See application file for complete search history.

(56) References Cited

U.S. PATENT DOCUMENTS

| 9,946,924 | B2 | 4/2018 | Sengupta et al. | |
| 2001/0044766 | A1* | 11/2001 | Keyes | G06Q 40/00 705/36 R |
| 2002/0052815 | A1* | 5/2002 | Johnson | G06Q 40/04 705/36 R |

(Continued)

OTHER PUBLICATIONS

Cooper, et al., "An evaluation of machine-learning methods for predicting pneumonia mortality," in Artificial Intelligence in Medicine, (1997), p. 107-138. (Year: 1997).*

(Continued)

*Primary Examiner* — Olabode Akintola
*Assistant Examiner* — Brandon M Duck
(74) *Attorney, Agent, or Firm* — Hunton Andrews Kurth LLP

(57) ABSTRACT

The invention relates to a computer-implemented system and method for grading of a loan using chained confidence scoring. The method may comprise the steps of: scanning documents within a credit file for the loan, extracting attributes from the scanned documents and from electronic documents in the credit file, calculating a plurality of calculated attributes based on the extracted attributes, calculating a loan risk rating based on the calculated attributes and the extracted attributes, calculating an aggregated confidence value associated with the calculated loan risk rating, and enabling a user to modify the loan risk rating, the aggregated confidence value, and a number of chained confidence values. The confidence values input by the user are used as training data to train a chained confidence model and the chained confidence model is used to calculate the aggregated confidence value in connection with the automated grading of a loan.

20 Claims, 10 Drawing Sheets

(56) References Cited

U.S. PATENT DOCUMENTS

| | | | | |
|---|---|---|---|---|
| 2012/0262461 A1* | 10/2012 | Fisher | ............... | G06F 40/232 |
| | | | | 345/467 |
| 2015/0254719 A1* | 9/2015 | Barfield, Jr. | ....... | G06Q 30/0273 |
| | | | | 705/14.53 |
| 2019/0205978 A1* | 7/2019 | Way | .................. | G06F 17/18 |
| 2019/0355058 A1* | 11/2019 | Huang | ............... | G06Q 20/386 |

OTHER PUBLICATIONS

Kotslantis, "Efficiency of Machine Learning Techniques in Bankruptcy Prediction," 2005 (Year: 2005).*

Adler, et al., Apr. 2017, in "Audting block-box models for indirect infleunce," in Knowdge Information Systems, vol. 54, p. 95-122.*

Vimeo Video link, https://vimeo.com/217172396/21c0531e29: IBM World of Watson 2016_ Steve Hill KPMG Keynote-HD (4:24), May 12, 2017.

Vimeo Video link https://vimeo.com/218543153: KPMG commercial mortgage loan audit process use case demonstration (5:00), May 22, 2017.

World of Watson: General Session; D. Kenny and J. Kelly (speakers) (85:00), Oct. 17, 2016 (20 pp).

* cited by examiner

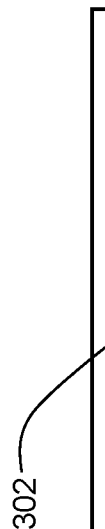

| ID | Level | Confidence Factor |
|---|---|---|
| 1 | NLP Evidence | Annotator Rule F1 |
| 2 | NLP Evidence | Variance of extracted values |
| 3 | NLP Evidence | Document type accuracy |
| 4 | NLP Evidence | Document date F1 |
| 5 | NLP Evidence | Resolution strategy confidence |
| 6 | NLP Evidence | Summary confidence on each attribute |
| 7 | Table Extracted Attribute | Relevance score of extraction of attribute from tables |
| 8 | Resolved Attribute | Resolution of extracted attribute F1 |
| 9 | Resolved Attribute | Formula used for calculated attribute |
| 10 | Calculated Attribute | Confidence on input attributes |
| 11 | Calculated Attribute | Calculated attribute confidence |
| 12 | Loan Risk Rating | grade model confidence |
| 13 | Loan Risk Rating | Confidence on input attributes |
|  | Loan Processing Confidence | Combined (aggregated) confidence |

Figure 3

CMLA

Engagement 1 Summary

Credit Files

- Not Started 20% ####
- In Progress 40% ####
- In Review 10% ####
- Complete 30% ####

Created MM/DD/YYYY
Created MM/DD/YYYY

Home / Engagement 1 / Credit Files

Credit Files (10) — 502

Search for a credit file

| Name ∨ | Attributes Accepted ∨ | Doc. Processing ∨ | Total Docs ∨ | Client Grade ∨ | Auditor Grade | Confidence ∨ | Status ∨ | |
|---|---|---|---|---|---|---|---|---|
| Credit File Name | ##% (# / ##) | ∨ | # | # | # | HIGH | ○ In Review | (WW) |
| Credit File Name | ##% (# / ##) | ∨ | # | # | # | MEDIUM | ○ Not Started | |
| Credit File Name | ##% (# / ##) | ∨ | # | # | # | MEDIUM | ○ Complete | (WW) |
| Credit File Name | ##% (# / ##) | ∨ | # | # | # | HIGH | ○ In Progress | (WW) |
| Credit File Name | ##% (# / ##) | ∨ | # | # | # | MEDIUM | ○ In Progress | (MA) |
| Credit File Name | ##% (# / ##) | ∨ | # | # | # | LOW | ○ Not Started | |
| Credit File Name | ##% (# / ##) | ∨ | # | # | # | HIGH | ○ In Progress | (LS) |
| Credit File Name | ##% (# / ##) | ∨ | # | # | # | HIGH | ○ In Progress | (WW) |
| Credit File Name | ##% (# / ##) | | # | # | # | MEDIUM | ○ Complete | (WW) |
| Credit File Name | ##% (# / ##) | | # | # | # | HIGH | ○ Complete | (WW) |

504 — Total Docs
506 — Client Grade
508 — Auditor Grade
510 — Confidence

Import    ← 1 of 1 →

CMLA

Document Name

1. BORROWER'S PROMISE TO PAY

Lorem ipsum dolor sit amet, consectetur adipiscing elit. Vivamus congue mi nisi, vel accumsan eros lacinia vitae. Nulla facilisi. Mauris eu lorem retrum, eleifend libero id, volutpat enim. Ut massa turpis, commodo at feugiat vitae, auctor a ligula. Vivamus ac scelerisque lorem. Aenean commodo ipsum mauris, vitae eleifend sem consectetur id. Aenean luctus bibendum neque pellentesque rutrum. Sed efficitur enim in metus commodo ultrices. In hac habitasse platea dictumst. Curabitur odio libero, sodales et nibh placerat, tempor molestie ex.

1. INTEREST

Pellentesque habitant morbi tristique senectus et netus et malesuada fames ac turpis egestas. Aenean placerat augue imperdiet felis scelerisque semper. Fusce tempor lectus velit, ut molestie erat luctus non. Donec congue venenatis maximus. Duis volutpat blandit volutpat. Duis et tortor quis ligula lacinia elementum. Vestibulum dictum ipsum sit amet semper convallis. In ultricies justo nec dapibus fermentum. Phasellus dignissim, lorem eu varius finibus, lacus velit rhoncus ligula, id iaculis nisl neque quis ipsum.

Morbi nunc mi, blandit ac magna eget, tempor dapibus ligula. Pellentesque ultricies finibus nisi, in vestibulum nisi pretium a. Nullam tincidunt lobortis risus at placerat orci placerat vel. Nam in laoreet dolor. Integer non mi non mauris tempor pretium a nec magna. Cras quis tempus risus, scelerisque varius dolor. Etiam ut est sed velit aliquet vulputate. Ut ornare aliquet placerat. Mauris tincidunt neque et volutpat convallis. Nunc lorem ex, ultricies vel facilisis et, condimentum vitae nunc. Aliquam consectetur aliquet sem, vel malesuada mauris rhoncus sit amet. Suspendisse sit amet ullamcorper nisl, et consequat lorem. Nam ultrices mi id lectus vehicula, ac interdum ex vulputate.

2. PAYMENTS

1. Time and Place of Payments

Donec quam lacus, ullamcorper eu lacus ut, ultricies pulvinar diam. Nam eu mollis odio. Vestibulum vulputate ultricies diam, at pharetra neque congue ac. Nullam sapien odio, semper volutpat feugiat quis, sodales in urna. Etiam convallis varius tortor, in pretium neque blandit in. Maecenas tincidunt ipsum at odio eleifend, vel blandit quam vulputate. Sed luctus hendrerit porta. Vestibulum non sagittis turpis. Proin molestie ex nec sagittis lacinia. Praesent dolor mi, eleifend sed sem quis, congue ultrices sapien. Sed augue enim, ornare eu tellus eu, consequat feugiat nibh. Donec volutpat erat sed rutrum viverra. Suspendisse consequat ipsum vitae varius vestibulum. Curabitur sagittis leo eu porta mollis.

2. Amount of Monthly Payments

Nullam sapien odio, semper volutpat feugiat quis, sodales in urna. Etiam convallis varius tortor, in pretium neque blandit in. Maecenas tincidunt ipsum at odio eleifend, vel blandit quam vulputate.

1. Non-Revolving Loan Facility

Nulla et eros vel lacus consequat tristique. Mauris eu eros eu arcu efficitur posuere. Suspendisse iaculis auctor felis sit amet accumsan. Donec lacinia et odio sed auctor. Etiam feugiat semper imperdiet. Nam convallis nisl

Figure 6B

LOAN AUDIT SYSTEM AND METHOD WITH CHAINED CONFIDENCE SCORING

FIELD OF THE INVENTION

The present invention relates generally to a loan audit system, and more particularly to a system and method for grading of bank loans with chained confidence scoring.

BACKGROUND

Banks and other financial institutions maintain portfolios of loans such as commercial mortgage loans. Given the risks associated with borrowers that become financially distressed, it is important for such financial institutions to be able to audit their loan portfolios to maintain current and accurate information on the level of risk of default. The value attributed to a portfolio of loans is also an important factor in determining whether a lending agency's reserves are correctly set. Known methods for auditing a portfolio of loans typically comprise a process that is largely dependent on the experience and judgment of individual auditors. For example, a bank may send its credit files for a portfolio of loans to an auditor. If there are a large number of loans, the auditor may begin by determining a representative sample of the loans to analyze within the portfolio, e.g., 40-60 of the loans. This step inherently introduces risk because it eliminates some portion of the loans from the analysis.

Next, a subject matter expert ("SME"), such as an experienced commercial mortgage loan auditor, reviews the credit file documents and locates and interprets relevant facts and attributes, such as the loan amount, type of collateral, payment history, primary source of repayment (PSOR), guarantor, appraised value, and third party information. The SME may consider primary and secondary sources for the facts and attributes. Primary sources may include the actual loan documents. Secondary sources may include third party information relevant to the appraised value or the collateral.

The SME will typically analyze dozens of files and hundreds of pages in his or her analysis of a loan. In this process, the SME may disambiguate multiple instances of an attribute across files, such as identifying a single loan type based on differing descriptions of the loan type in the credit file. The SME may also discover evidence of anomalies beyond explicit facts that impact the risk rating. For example, the SME may uncover anomalies in the loan documents that does have a bearing on the borrower's risk of default.

Based on his or her experience and guidelines, the SME makes a judgment as to the appropriate loan risk rating. Typically, a formula is not used to perform a calculation, and conclusions are drawn from multiple reviews. It is not uncommon for two different SMEs to adjudicate different loan risk ratings for the same commercial mortgage loan. The SMEs resolve differences through additional human reviews and discussions. The SMEs may also provide an overall confidence value, based on their experience and judgment, which specifies the SME's level of confidence that the loan risk rating is correct. There is no calculation or quantification used to arrive at the overall confidence value; rather, it is chosen by the individual auditor based on his or her judgment and interpretation of various documents in the credit file as well as any applicable internal guidelines.

Although the known processes generally provide an acceptable level of accuracy, there are certain disadvantages, such as the need to reconcile differing conclusions, the reliance on human experience and judgment, the need to rely on only a small sample of loans in the portfolio that are reviewed, and the expense of labor involved in the process. Accordingly, it would be desirable to have an automated system and method to overcome these and other disadvantages.

SUMMARY

According to one embodiment, the invention relates to a chained confidence scoring system that is used with the grading of a commercial mortgage loan. In operation, the system captures not only the users' case feedback (e.g., the ability to change the system-proposed loan risk rating), but also a plurality of confidence values associated with the processing of that loan risk rating. The confidence values are numerical values (e.g., a decimal value between zero and one, or a percentage) that represent a confidence level that a particular task in the analysis of loan documents (e.g., successful extraction of data from a table) has been performed correctly. The system uses an active learning approach to generate a body of training data, where the training data is the set of confidence values for the cognitive processing steps involved in grading a commercial mortgage loan, along with the outcome of that loan grading (score generated was "correct"). A chained confidence model is then trained, the end result of which is to enable the calibration/correlation of a chained confidence value with the correct adjudication of a loan. The chain of confidence values are used as features in a model which can be trained. The trained chained confidence model enables the processing of commercial mortgage loans, wherein a user can auto-accept the system-determined loan risk rating if the chained confidence value is above a predefined threshold.

Exemplary embodiments of the invention can provide a number of advantages to loan auditors using the system. For example, because the system quantifies individual confidence values for a number of intermediate steps in the loan analysis (e.g., 13 confidence values according to one embodiment), calculation by the system of the overall (aggregated) confidence value can be more accurate than the overall confidence value a human auditor may choose based on his or her unquantified judgment. The system is also scalable. For example, rather than having an individual auditor choose a representative sample of loans to analyze, the system can analyze all loans in the portfolio without human resource limitations. The combination of quantitative analysis with review of the entire loan portfolio can provide the advantage of more precise results which better reflect the reserves that an institution is required to maintain. The system is also much less dependent on individual auditors. For example, with existing processes, if an individual auditor is not able to complete his or her analysis on a loan, another auditor generally would need to start the analysis from the beginning. By contrast, exemplary embodiments of the invention are not dependent on an individual completing the process from start to finish. Rather, the system acquires the collective experience of individual auditors by training a model. And because the input of individuals using the system is recorded, the system can maintain a complete record of the input data, which represents an advance over the completeness of saved work papers associated with a loan in known processes.

These and other advantages will be described more fully in the following detailed description.

BRIEF DESCRIPTION OF THE DRAWINGS

In order to facilitate a fuller understanding of the present invention, reference is now made to the attached drawings.

The drawings should not be construed as limiting the present invention, but are intended only to illustrate different aspects and embodiments of the invention.

FIG. 3 is a chart showing a number of confidence factors corresponding to different levels that are used in the chained confidence module in connection with an automated loan risk assessment according to an exemplary embodiment of the invention.

FIG. 5 is an example of a user interface illustrating grades for a number of loans and an overall confidence value for each grade according to an exemplary embodiment of the invention.

FIGS. 6A and 6B show an example of a user interface illustrating a number of calculated attributes and an associated attribute calculation confidence according to an exemplary embodiment of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Figure 1:
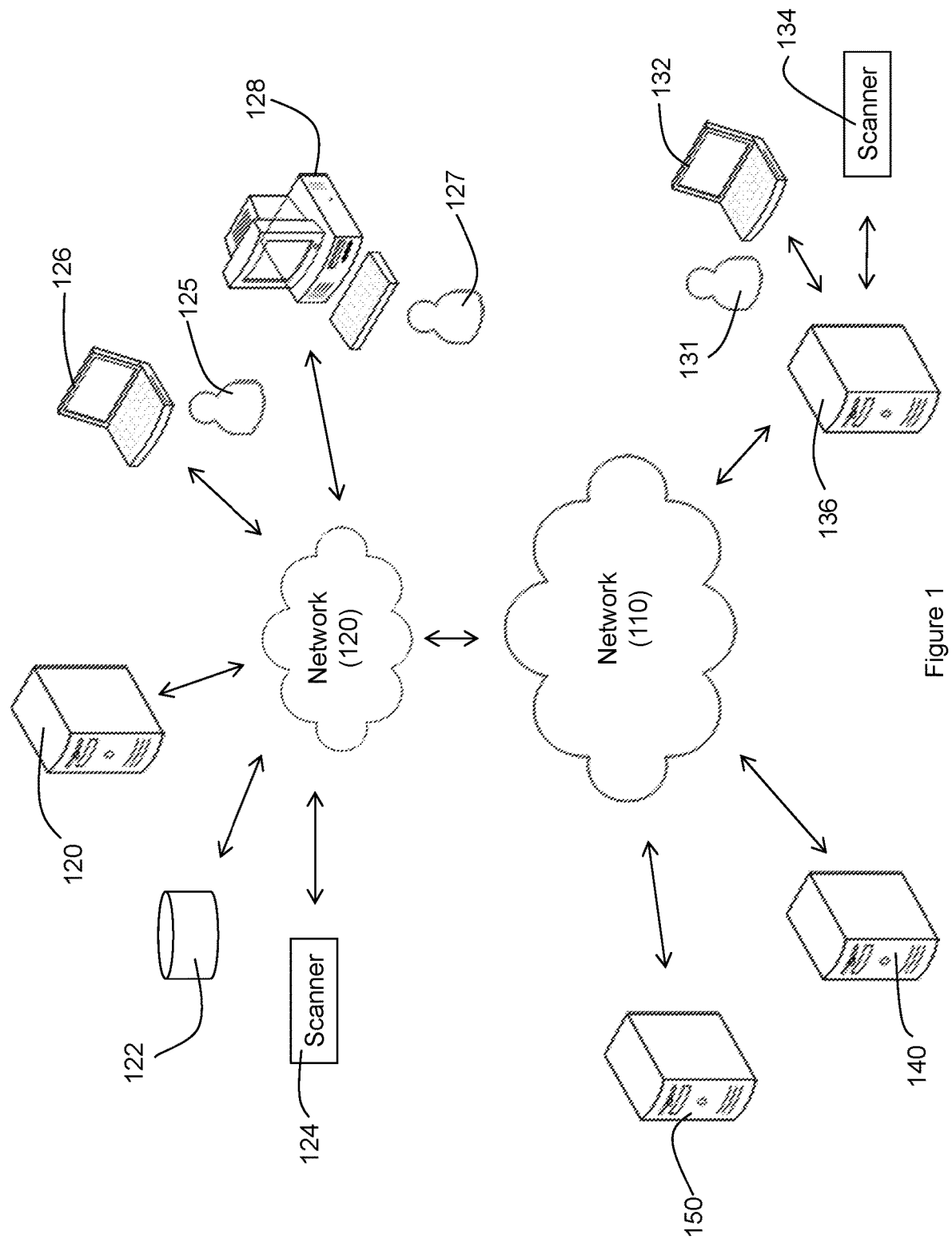
FIG. 1 is a diagram of an automated loan audit system according to an exemplary embodiment of the invention.

According to one embodiment, the invention relates to an automated loan audit system with chained confidence scoring. FIG. 1 is a system diagram showing an example of the loan audit system. As shown in FIG. 1, the system may comprise a server 120 and associated database 122 along with software and data that are used to run the system. The system may also include a scanner 124 used to scan original hard copy documents, such as credit files from a client. The server 120 and database 122 may be used to store the scanned images of original documents, as well as to store any electronic documents in the credit file, software, and other data used to run the system. A user 125 such as a subject matter expert (e.g., commercial mortgage loan auditor) can access and use the system 120, database 122, and scanner 124 through a personal computing device 126, such as a laptop computer, desktop computer, tablet computer, or mobile phone, for example. FIG. 1 also shows an additional user of the system 127, who may be a data scientist or administrator, for example, who accesses the system through a personal computing device 128 such as a desktop computer.

According to one embodiment, the system is owned or operated by an auditing firm which uses the system to evaluate risk in portfolios of commercial mortgage loans held by its bank clients. As shown in FIG. 1, a representative 131 at the client may use a personal computing device 132 and server 136 to store and send credit files to the auditor via a network 110. The credit files may comprise a combination of scanned images of documents and electronic documents, for example. The client may use a scanner 134 to create scanned images of hard copy documents which are then stored in the server 136 and/or personal computing device 132 along with any electronic documents. FIG. 1 also shows third party servers 140 and 150 that may provide the auditor with relevant data on the loans. For example, the auditor may acquire property valuation data from server 140 operated by an appraiser and may acquire credit history data on borrowers from server 150 operated by a credit bureau.

Also shown in FIG. 1 are networks 110 and 120. The networks 110, 120 may comprise any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example. The other computing devices, e.g., servers, desktop computers, laptop computers, and mobile computers, may be operated by different individuals or groups, for example, and may transmit data such as credit files to the server 120 and database 122 via the networks 110, 120.

Figure 2:
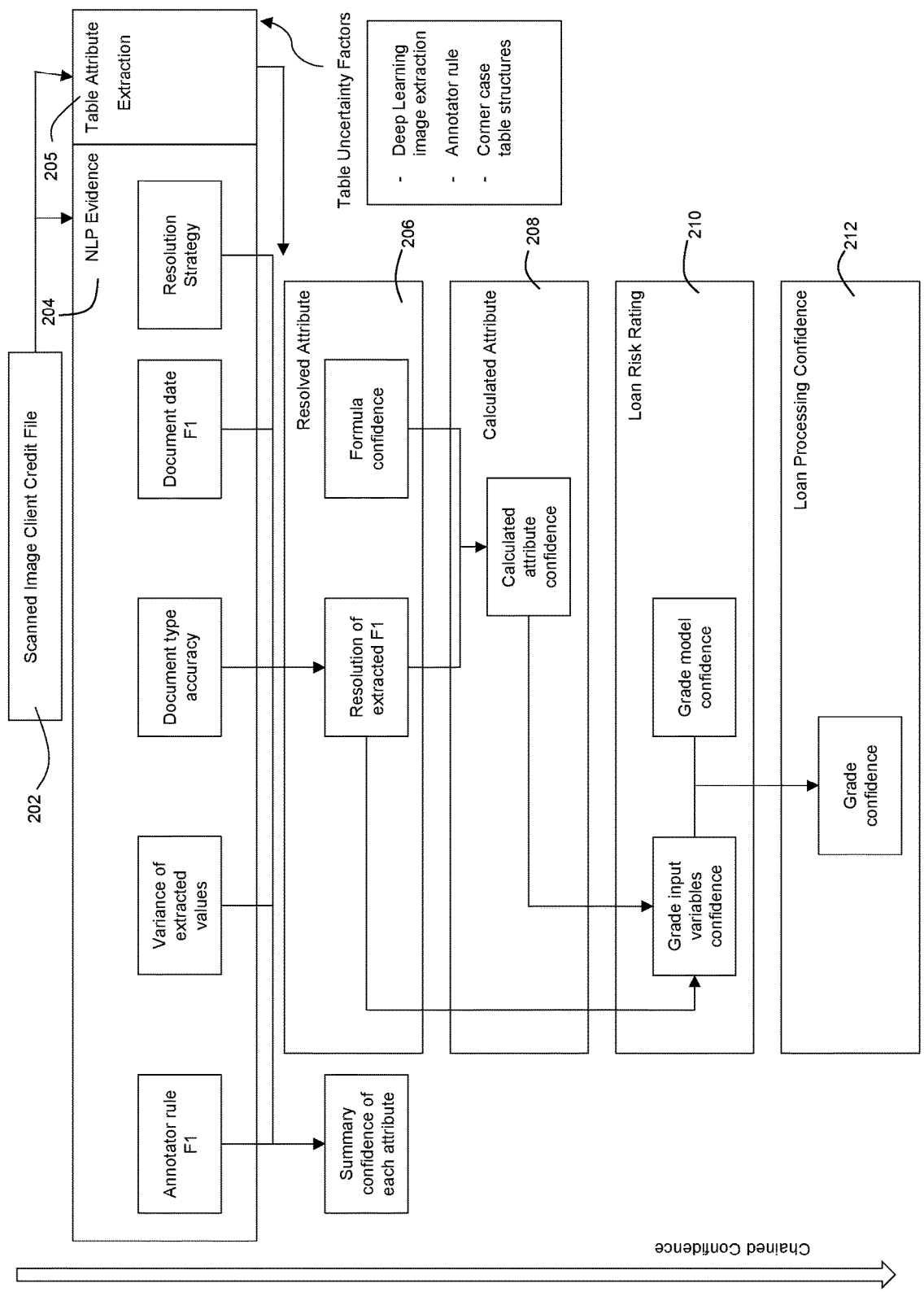
FIG. 2 is a diagram illustrating a process for automated loan risk assessment, including a chained confidence module according to an exemplary embodiment of the invention.

FIG. 2 illustrates a process for automated loan risk assessment with chained confidence scoring according to an exemplary embodiment of the invention. As shown in FIG. 2, the process starts with a scanning step 202 to create an electronic image of original documents in a client credit file. The credit file may include, for example, a promissory note, security agreement, recordation of lien documents, payment history, and other conventional loan documents. The credit file may comprise both hard copy documents that need to be scanned into images, as well as electronic documents that do not need to be scanned. The scanning of hard copy documents in step 202 may be conducted by the client using its scanner 134 or by the auditor using scanner 124. The scanning process 202 will typically utilize optical character recognition (OCR) to convert an image into text characters that can be read and processed by the system. The scanning process may also comprise extraction of attributes from tables in the credit file.

As shown in FIG. 2, the process of automated loan grading comprises a number of cognitive processing tasks. Examples of cognitive processing tasks may include determining a loan origination date, obtaining a value from a table in a loan document, determining a document type for a document within the credit file, and determining a variance of extracted values. According to one embodiment, each cognitive processing task in a defined set of tasks has an associated confidence factor. The confidence factor quantifies the likelihood that the cognitive processing task has been performed correctly and may be expressed as a decimal between 0 and 1 or a percentage, for example.

FIG. 3 illustrates a list of confidence factors 302 that can be used in an automated commercial mortgage loan grading process with chained confidence scoring according to one embodiment of the invention. In operation of the system, each of the confidence factors 302 will have a value according to one embodiment of the invention. As shown in FIG. 3, there are thirteen confidence factors that are used. The confidence factors 302 in FIG. 3 correspond to the cognitive processing tasks shown in FIG. 2.

Referring again to FIG. 2, the cognitive processing tasks and associated confidence factors can be grouped into five levels, according to one embodiment of the invention. As shown in FIG. 2, the first level, NLP Evidence 204, relates to electronically scanning the documents in the credit file and using natural language processing (NLP) to interpret the content of the scanned and electronic documents. Cognitive processing tasks in this level may include an annotator rule F1, determination of the variance of extracted values, documentation type accuracy, document date F1, resolution strategy confidence, and summary confidence of each attribute. F1 scores are a type of accuracy metric that takes into account both the robustness of the technique (the recall) and the correctness of the technique (the precision). It is a good way to demonstrate accuracy for NLP because it considers both how often something was not proposed when it should have been (recall) and how often something was proposed that was incorrect (precision). The calculation for F1 is $$2\left(\frac{\text{precision} \times \text{recall}}{\text{precision} + \text{recall}}\right).$$

Table Attribute Extraction 205 in FIG. 1 refers to an automated cognitive process in which one or more attributes are extracted for a table in a loan document. Within the documents which are provided for a loan risk rating professional, some needed data elements are often contained in tables. Typically, the technical table structure within which the material is provided is not a standard, pre-defined table structure. Thus, a range of IT industry approaches to "table extraction" are used to extract attribute values from a table source. In addition, for tables which are imbedded within a scanned document (as opposed to an electronic document), the technical approaches leverage technically advanced approaches such as deep learning. Every approach to extracting attribute/cell values from a table introduces a "confidence" telemetry factor which the chained confidence mechanism incorporates into the chained confidence model training. As indicated in FIG. 2, examples of uncertainty factors include the aforementioned deep learning understanding of scanned images of a table, annotator rules used by a table data extraction capability, and "corner case" (or, very infrequently seen) technical table structures for which the table extraction capability to be used has not yet been trained to yield a high confidence. Thus, for each table cell value (directly used as an attribute in a loan risk rating calculation, or used as a value in the calculation of a derived attribute value), a confidence value is associated with that "table value extraction" step.

The second level, Resolved Attribute 206, generally relates to cognitive processing tasks for resolution of extracted attribute F1 and formula confidence. Once all possible values are extracted for an attribute, the resolution process applies normalization and resolution to find the best possible value for the attribute. Normalization changes all values to a single format (for example, January 1, 2018 and 01/01/18 will both be converted to 01-01-2018). Resolution then determines, for example, that if there are five values that normalize to 01-01-2018 and one that normalizes to 01-01-2017, the likely answer is 01-01-2018 (unless the other value comes from a document that has higher priority). These logics are all written and incorporated into the derivation and resolution services in the system, and contribute to the overall interpretation. Confidence of the resolved attributes may be important because not all logics are created equal. For example, there may be some logics that work most of the time, but can fail. In that case, confidence of that resolved attribute is reduced appropriately.

The third level, Calculated Attribute 208, relates to confidence in calculated attributes. Once all extracted attribute values have been normalized and resolved, the derivation and resolution services applies logics and calculations that create values for other calculated attributes. According to one example, there may be a calculated attribute for how many months remain on a lease, and the system has extracted both the lease begin date and the lease end date. A calculation logic is created that determines today's date and applies an algorithm to generate the value for the new calculated attribute based on the previous extracted attributes. However, not all calculations are created equal. Some calculations may be more recall-oriented and imprecise, so the system is designed to calculate how confident it is in a particular calculation (as well as in the attributes that were used as input for the calculation).

The fourth level, Loan Risk Rating 210, relates to grading of input variables confidence and grade model confidence. Each machine learning (ML) model in the system is able to calculate a confidence of how well the model appears to match the test data that is being put in. In addition, a confidence factor can be added for the input variables themselves to the grade model confidence, because while the model is unable to determine the veracity of the attributes that are used as input, the previous iterations of confidence in the system can. This combined confidence provides a more reasonable view of the risk rating itself than the typical machine learning confidence alone.

The fifth level, Loan Processing Confidence 212, relates to the overall loan grade confidence. This confidence is an amalgamation of each of the previous factors, which are combined based on static rules of how much a role each of the engines play in the overall confidence. The static rules determine not only the order in which the confidences are applied, but also the weight of each confidence to the final confidence model.

According to an exemplary embodiment of the invention, the system provides an instance of a cognitive solution in which multiple different cognitive technology solutions are used to perform an analysis of a commercial mortgage loan case. Each cognitive processing task has an associated "confidence value" which quantifies the likelihood that the cognitive processing task has been performed correctly. In addition, the system derives an overall confidence value using the chained confidence methodology described herein.

According to an exemplary embodiment of the invention, the chained confidence module comprises the following elements.

1. The system allows end users (e.g., loan auditors), using actual client credit files and related data, to provide their case feedback, e.g., the ability to change the system-proposed loan risk rating. The system can also calculate and capture the confidence values (e.g., 13 confidence values according to one embodiment, as shown in FIG. 3) associated with the processing of that loan risk rating. When the values are changed by the user, this changes not only how the risk rating is calculated across the different engines, but also enables the system to optimize the rules used to weight each of the confidence factors in the final confidence calculation.

2. This active learning approach generates a body of training data, where the training data is the set of confidence values for each cognitive processing step for each loan case, along with the outcome of that case (score generated was "correct").

3. The body of training data is then used to train a chained confidence model, the end result of which enables calibration/correlation of a chained confidence score (e.g., an overall confidence score for the loan grade) with the correct adjudication of a case. In other words, the approach is to use the chain of confidence scores as features in a model which can be trained, according to one embodiment of the invention.

4. The foregoing process results in a trained chained confidence model that enables the automated processing of commercial mortgage loans and other types of loans, according to one embodiment. The user can auto-accept the system-determined loan risk rating if the chained confidence value is above the calibrated score from step 3 above.

Figure 4:
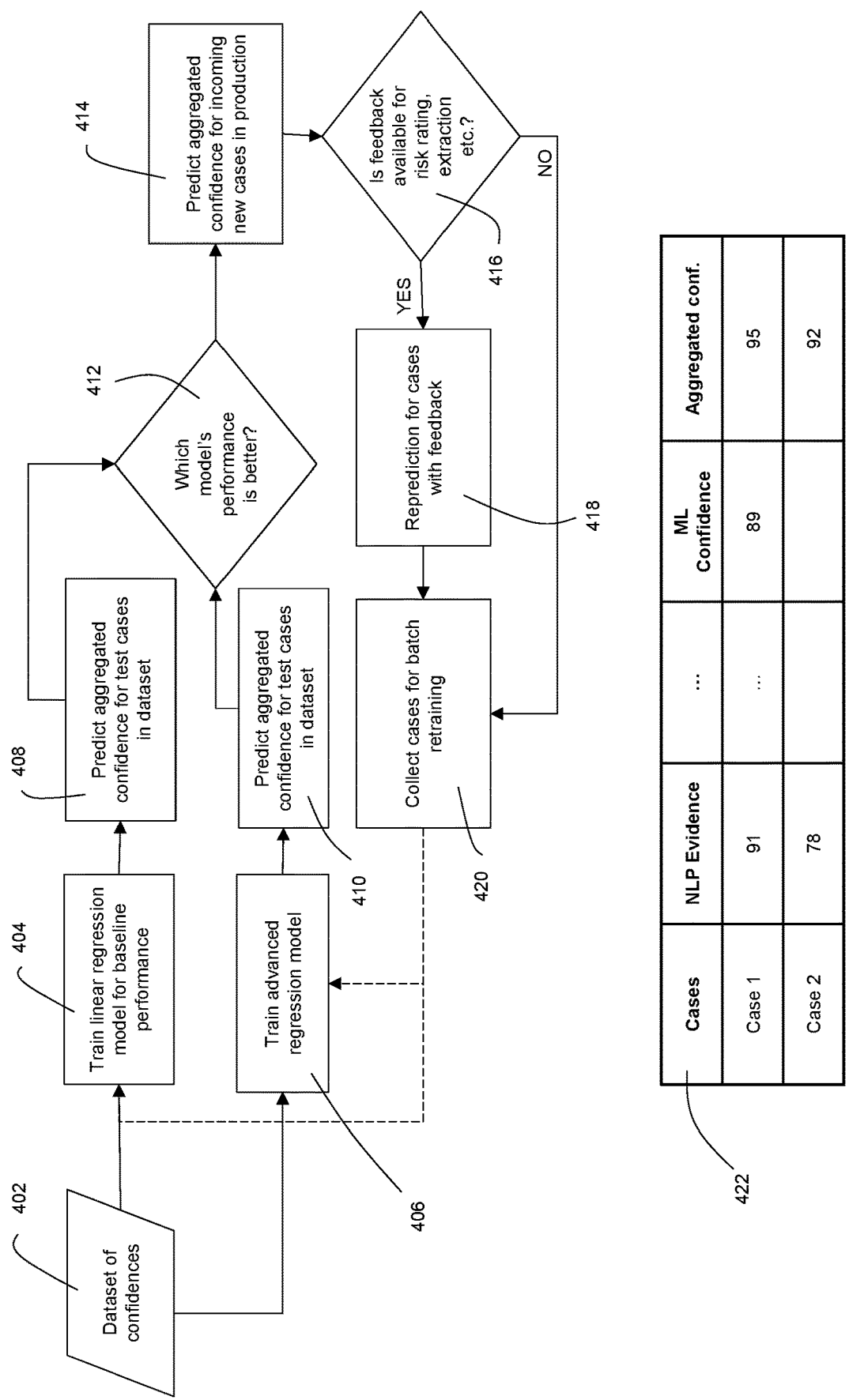
FIG. 4 is a flow diagram illustrating a chained confidence training process according to an exemplary embodiment of the invention.

FIG. 4 is a flow diagram illustrating the chained confidence training process according to an exemplary embodiment of the invention. A statistical learning process needs, at first, a static set of data points that is representative, to a reasonable degree, of the population of examples seen in a real world application. In FIG. 4 at step 402, a similar dataset is curated with the 13 confidence factors previously calculated at various stages of the pipeline. With this dataset, an iterative process is started wherein a set of weights (13 in this example) is to be learnt such that an aggregation of these 13 individual confidence factors will lead to an optimal overall, aggregated confidence score. This iterative learning is carried out in both the linear and advanced regression algorithm training stages shown in steps 404 and 406 in FIG. 4. While undergoing this training, statistical parameters are added to the regression model to keep it fair in its learning. This ensures that the model is generalized and accounts for the variability in examples seen in the real world. As shown in FIG. 4, the process starts in step 402 with a dataset of confidences. For example, the dataset may include the 13 confidence values for a particular loan. In step 404, the confidence values are used to train a linear regression model for baseline performance. In step 406, the confidence values are also used to train an advanced regression model. The trained linear regression model is used to predict aggregated test cases in a dataset in step 408. The advanced regression model is also used to predict aggregated confidence for test cases in a dataset in step 410. These two aggregated confidences are compared in step 412 to determine which model has the better performance. In step 414, based on the model with better performance, the system predicts aggregated confidence for incoming new cases in production In step 416, the system determines whether feedback is available for the risk rating, extraction, etc. If the answer is yes, in step 418 user feedback can be collected to override the algorithm predictions of confidence if errors are perceived since no algorithm or machine performs at a 100% efficiency. Once this feedback is available, a set of these new cases can be batched for an iteration of training building on the model available in the previous iteration as in step 420. Over time, as new cases are seen more and more and the learning process knows more and more about the real world population, the algorithm performs at incrementally better levels than previous passes of predictions. In step 416, if the answer is no, the cases are collected for batch retraining in step 420. The data is then transmitted to the linear regression model and the advanced regression model for training, and the process repeats.

FIG. 4 also shows a table of confidence factors 422 for a number of loans (Case 1, Case 2, etc.). For example, Case 1 may represent a commercial mortgage loan and the table shows each of the 13 confidence factors and associated values identified in FIG. 3. It also shows the aggregated confidence value, i.e., the overall confidence in the loan grade. As can be seen from the table 422 in FIG. 4, the aggregated confidence value can be higher than the individual confidence values, due to the training of the chained confidence algorithm. The aggregated confidence value may turn out to be higher than the individual confidence values since the final aggregation is a weighted sum of the individual confidence values. How the individual confidences are weighted, i.e., the weights for each term in the sum, are the parameters being learnt in the training process. Through statistical error calculations over many iterations, the combination of weights that provide the least error is retained. This iterative error checking process leads the regression algorithm to learn the weights in a manner that automatically weights the most important confidence factor highly and the least important factor low. This optimal set is retained for future use when and if a new case with the respective 13 confidence factors becomes available, and these retained weights are then applied to arrive at an aggregate confidence for the new case.

FIG. 5 illustrates an example of a user interface for an overall loan confidence factor according to an exemplary embodiment of the invention. Initially, the user (e.g., a professional commercial mortgage loan auditor) can select a particular client (e.g., a bank) to view credit files for that client. The user interface lists the name of each credit file 502, along with the total number of documents 504 in the credit file, the client's grade 506 for the credit file, the auditor's grade 508 for the credit file, and the overall loan confidence 510.

Figure 6A:
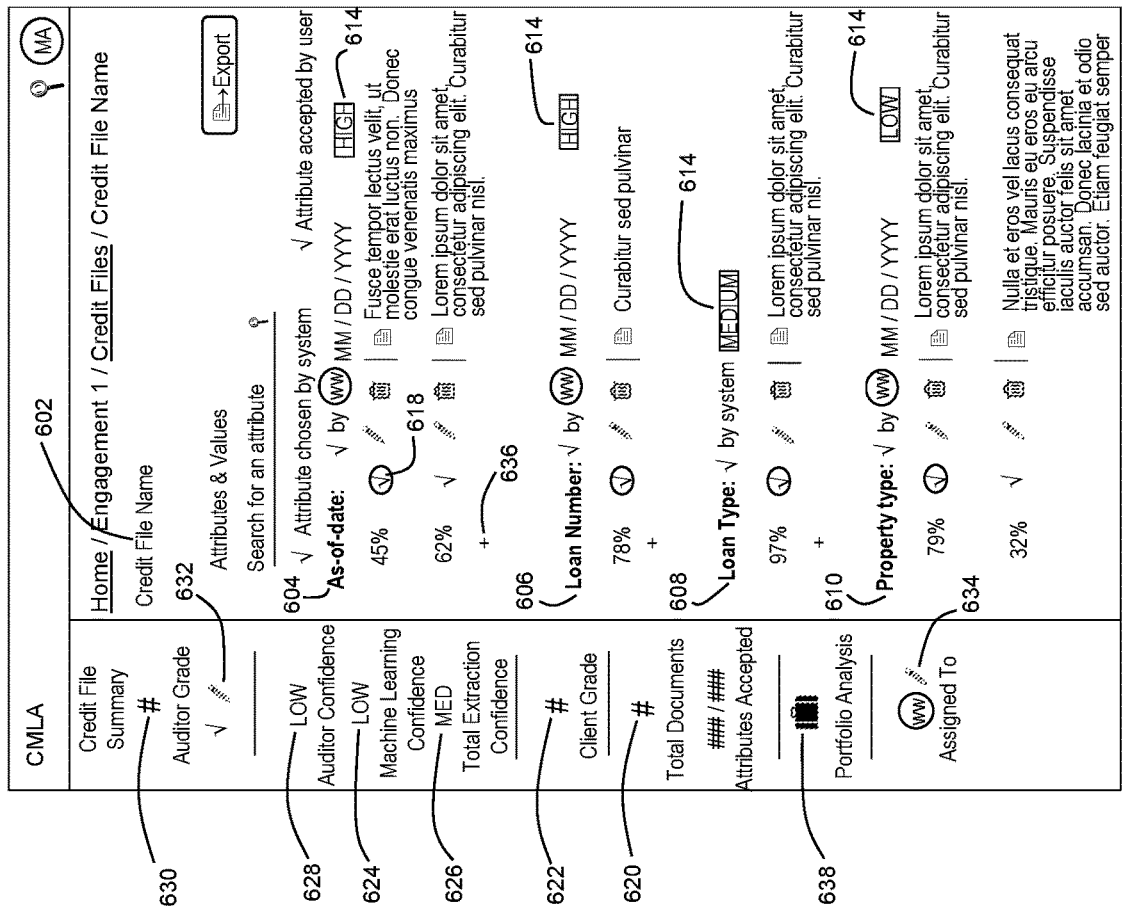

FIGS. 6A and 6B illustrate an example of a user interface for analysis of an calculated attribute confidence. Preferably, FIGS. 6A and 6B are presented side by side on a single computer screen. As shown in FIG. 6A, the user interface presents information on a particular credit file 602 identified in the header. This screen may be accessed, for example, by clicking the credit file name 502 in FIG. 5 for a particular credit file. In FIG. 6A, the credit file 602 is identified, along with information on different attributes for the credit file. For example, regarding loan details, a number of attributes are identified, including an As-of-date 604, a loan number 606, a loan type 608, and a property type 610. For each attribute, there is an attribute calculation confidence 614, which represents a confidence in the calculation of the attribute. As shown in FIG. 6B, there is also a view of the original, corresponding evidence (e.g., the relevant portion of a document in the loan file) with highlighted values 616 that have gone into the attribute calculation. This presentation allows the user to see the evidence from which the attribute was derived. The user interface in FIG. 6A also includes an indication 618 of whether the calculated attribute has been accepted. The user interface also allows the user to manually add values for an attribute by either by selecting "+" (element 636 in FIG. 6A) or by selecting text in the original evidence shown in FIG. 6B.

FIG. 6A also illustrates that the user can view the total number of documents in the credit file 620, client's grade for the loan 622, machine learning confidence 624, total extraction confidence 626, overall loan confidence 628, auditor's grade for the loan 630, and a portfolio analysis button 638. Clicking the analysis button 638 allows the user to view additional details of the analysis involved with grading the loan. Further, the user can accept or manually edit (e.g., by clicking the edit icon at 632) the auditor's grade associated with the credit file, as described further below in connection with FIG. 7. Finally, the user may edit the current assignee for that particular credit file by clicking the icon at 634 in FIG. 6A.

Figure 7A:
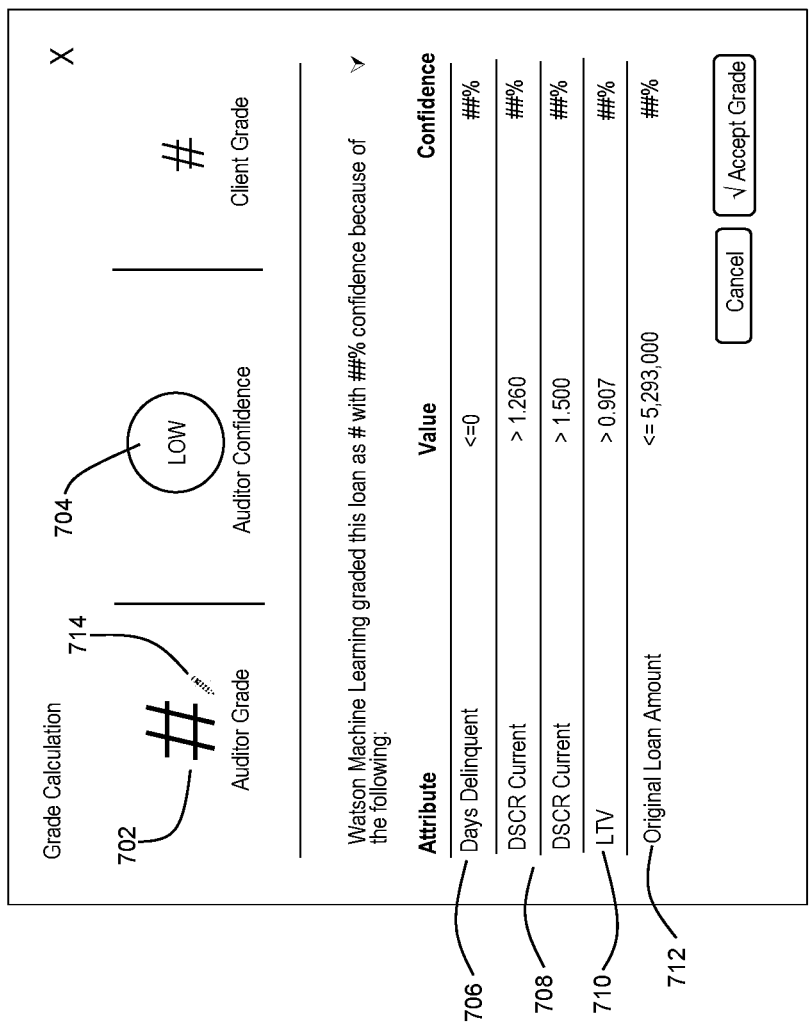
FIGS. 7A and 7B show examples of a user interface illustrating loan grades and associated confidence values according to an exemplary embodiment of the invention.
Figure 7B:
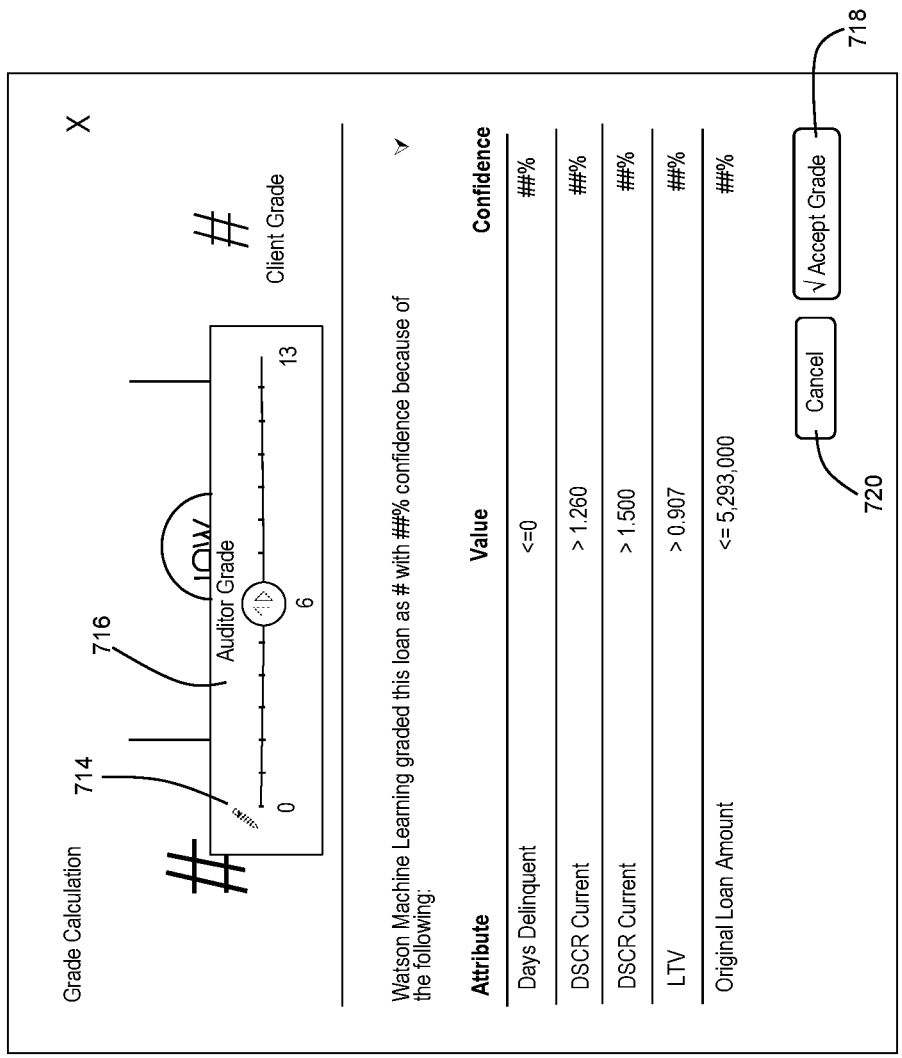

FIGS. 7A and 7B illustrate an example of a user interface for risk rating confidence according to an exemplary embodiment of the invention. As shown in FIG. 7A, the interface shows the auditor's loan grade 702 and auditor confidence 704. It also provides the basis for the auditor's loan grade. In the example shown in FIG. 7A, the basis for the loan grade and confidence cites days delinquent 706, the debt service coverage ratio (DSCR) 708, the loan to value (LTV) 710, and the original loan amount 712. The DSCR 708 represents the cash flow available to pay current debt obligations. The LTV 710 is the loan amount divided by the property value. These values enable the user to evaluate the level of confidence in the loan grade 702. This auditor's grade 702 is also editable via an edit button 714 adjacent to the auditor's grade. Clicking on the edit button 714 provides a slider 716 to change the grade as shown in FIG. 7B. The user is then able to accept the grade by clicking on the Accept Grade button 718 or cancel and close the modal window by clicking on the Cancel button 720, as shown in FIG. 7B.

Figure 8:
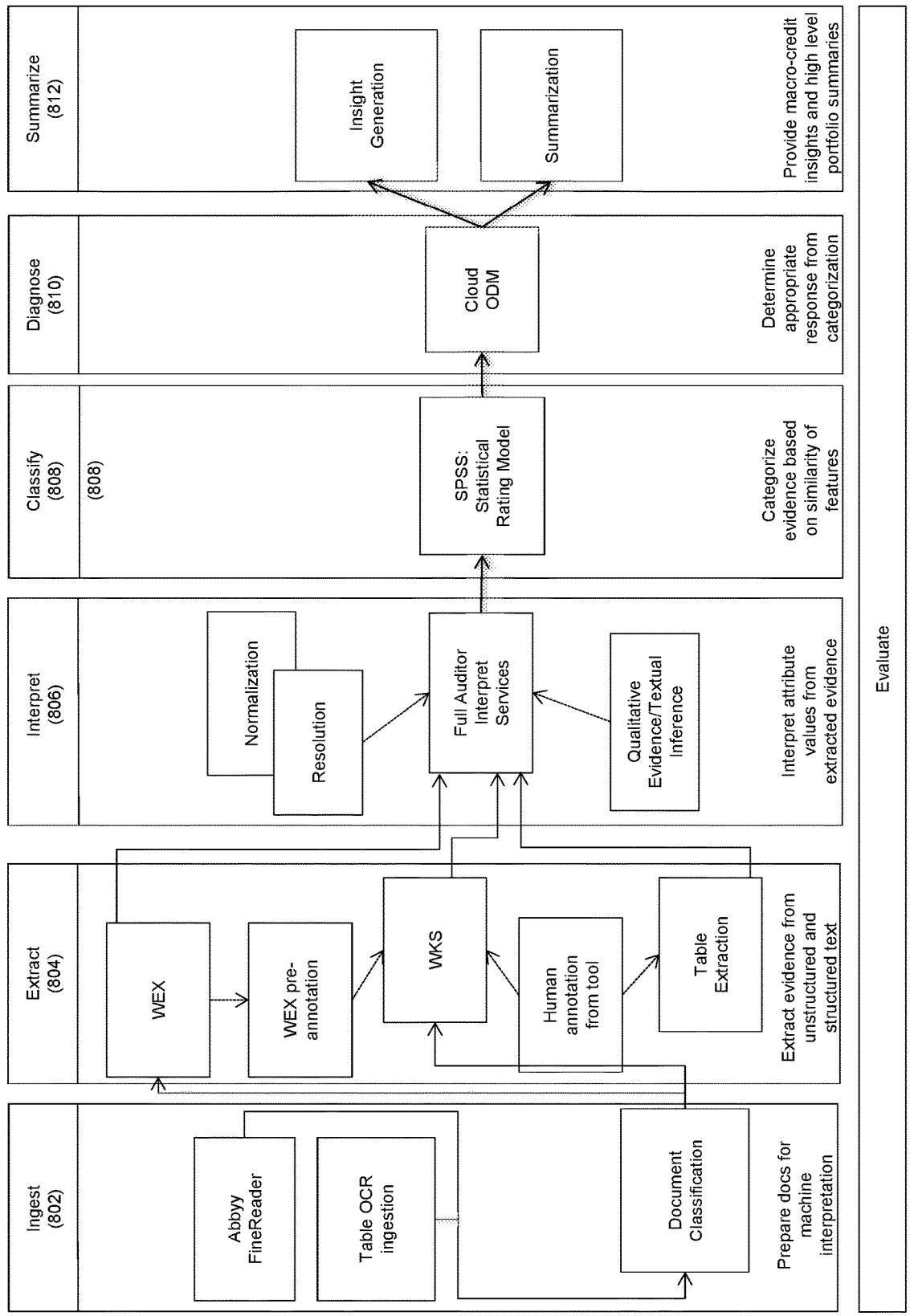
FIG. 8 is a diagram illustrating an example of a deployment architecture for an automated loan auditing system according to an exemplary embodiment of the invention.

FIG. 8 illustrates an example of a deployment architecture for the system according to an exemplary embodiment of the invention. As shown in FIG. 8, the architecture may be divided into various functions, such as Ingest 802, Extract 804, Interpret 806, Classify 808, Diagnose 810, and Summarize 812.

In the Ingest function 802, Abbyy FineReader may be utilized to perform OCR according to one embodiment of the invention. Tables may be ingested with optical character recognition (OCR). Documents may be classified in preparation for extraction. For example, the system may be trained to recognize certain types of loan documents based on their content and format.

The Extraction functionality 804 may involve the use of an extraction module such as WEX (Watson Explorer), WKS (Watson Knowledge Studio), zone-based OCR, and table extraction. Each engine targets separate attributes based on the types of documents and text they are likely to appear in. WEX is a rule-based extraction engine, and therefore works best on attributes that are either fairly static in their text representation, or are so different from client to client that a statistical system is unlikely to learn the pattern from such small data. WKS, on the other hand, does very well on attributes that have a lot of variation within and across clients, and are likely to appear in unstructured text. Table extraction focuses on attributes that appear in tables, and zone-based OCR works well for attributes that appear in forms (such as tax documents). The extract functionality operates to extract evidence from unstructured and structured text.

The next step is the Interpret step 806, which involves interpreting attribute values from extracted evidence. This step includes normalization and resolution. Normalization may involve translating various data points (e.g., dates) initially in different formats, into a common format such as YYYY-MM-DD. Resolution involves adoption of a single value where differing or conflicting values for the same variable are found in the credit file. Qualitative evidence and textual inference may be utilized to provide the full auditor interpret services. The goal of resolution is to take multiple found values for a single attribute and resolve them into a single, most-likely candidate value for that attribute.

Once the attribute values have been interpreted, the Classify step 808 can be executed to categorize evidence based on similarity of features. An SPSS statistical rating model, e.g., as offered by IBM, can be used. This model takes as input the attributes and values found from extracted evidence, as well as a few global values that are deemed to be important to credit risk rating, and uses the values to determine the optimal categorization of the loan into various risk categories. According to one embodiment, the model contains thirteen risk categories, and the classifier is able to distinguish into five broad categories.

The output of the Classify step 808 is input into a Diagnose step 810, which determines an appropriate response from the categorization. A Cloud Operational Decision Manager, such as the IBM ODM, can be used. ODM incorporates business logics that translate the broad categorizations from the classifier into more granular evidence. ODM is also able to override certain classifications from the machine based on features that might be difficult for the machine to learn at first (for example, if a loan balance is above a certain amount, the loan is always considered risky).

The final step is Summarization 812, which provides macro-credit insights into high level portfolio summaries. This may involve insight generation and summarization. While confidence is not added to this layer, the Summarization step 812 essentially takes the results from the loan risk rating and incorporates external news and events as well as more portfolio-wide information to generate insights for the auditor and the client.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements. For example, although the disclosure has been directed primarily to automated grading of commercial mortgage loans, it can be used in connection with automated grading of other types of loans, and to automated analysis of other types of contracts and other legal or business documents, for example.

The system described above can be implemented with servers and other computing devices in various configurations. The various servers and computing devices may use software to execute programs to execute the methods described above. Various embodiments of the invention also relate to the software or computer readable medium containing program instructions for executing the above described methods for automated grading of a loan with chained confidence scoring.

Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers and personal computers described above and in the drawings may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications networks connecting the various computing devices described above may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The communications networks that connect the various computing devices described above may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications networks 110, 120 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication networks 110, 120 may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication networks 110, 120 may comprise a Personal Branch Exchange (PBX), which may further connect to the PSTN.

Although examples of servers and personal computing devices are described above, exemplary embodiments of the invention may utilize other types of communication devices whereby a user may interact with a network that transmits and delivers data and information used by the various systems and methods described herein. The personal computing devices may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The personal computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device. The personal computing devices may include various connections such as a cell phone connection, WiFi connection, Bluetooth connection, satellite network connection, and/or near field communication (NFC) connection, for example.

The servers and personal computing devices described above may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices described above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented method for automated grading of a loan with chained confidence scoring that represents an aggregated confidence value of a plurality of tasks and corresponding confidence values in a loan determination, the method comprising:

electronically scanning, by a scanning unit, a plurality of documents within a credit file for the loan; and generating at least one scanning confidence value that represents that a corresponding electronic scanning task has been performed correctly;

electronically extracting, by a computer processor, a plurality of attributes from the scanned plurality of documents; and generating at least one extraction confidence value that represents that a corresponding electronic extracting task has been performed correctly wherein the at least one extraction confidence value is based on at least one of: a determination of variance of extracted values, document type accuracy, and a resolution strategy accuracy;

calculating, by the computer processor, a plurality of calculated attributes based on the extracted attributes; and generating a calculated attribute confidence value that represents that a corresponding attribute calculating task has been performed correctly wherein the calculated attribute confidence value is based on normalizing and resolving at least one of: input attributes and calculated attributes;

calculating, by the computer processor, a loan risk rating based on the calculated attributes and the extracted attributes; and generating a model confidence value associated with the calculated loan risk rating wherein the model confidence value represents a measure of accuracy of a corresponding model's performance;

enabling a user, through an interactive user interface, to modify at least one of: the scanning confidence value, the extraction confidence value, the calculated attribute confidence value, the model confidence value, and the loan risk rating, wherein the interactive user interface is communicatively coupled to the computer processor to provide optimized weights applied to each of the confidence values;

training, by the computer processor using a machine learning algorithm, a chained confidence model using the modified at least one of the scanning confidence value, the extraction confidence value, the calculated attribute confidence value, the model confidence value, and the loan risk rating as collective training data from multiple sources of loan data, wherein the training employs the machine learning algorithm to grade the confidence of the chained confidence model and improve the chained confidence model;

calculating, using the trained chained confidence model, an overall loan grade confidence value for an automated grading of a loan, the overall loan grade confidence value represents an aggregated confidence value based on a combination of: the scanning confidence value, the extraction confidence value, the calculated attribute confidence value, the model confidence value, and the loan risk rating;

enabling, by the interactive interface, a loan auditor to grade the overall loan grade confidence value and provide a basis for the loan auditor grade; and improving the machine learning algorithm by using the loan auditor grade and basis for that grade as feedback into the machine learning algorithm.

2. The method of claim 1, further comprising the step of automatically accepting the calculated loan risk rating if the calculated overall loan grade confidence value is above a predetermined value.

3. The method of claim 1, wherein the credit file for the loan further includes a plurality of electronic documents that have not been scanned, and the method further comprises the step of electronically extracting a plurality of attributes from the plurality of electronic documents.

4. The method of claim 3, wherein the step of electronically extracting a plurality of attributes from the scanned plurality of documents further comprises applying natural language processing to the scanned documents and to the electronic documents.

5. The method of claim 1, wherein the step of electronically extracting a plurality of attributes comprises extracting at least one attribute from a table.

6. The method of claim 1, wherein the step of electronically extracting a plurality of attributes further comprises normalizing a plurality of values to a single format and resolving a plurality of values to a single value.

7. The method of claim 1, wherein the step of training the chained confidence model comprising calculating a weight for at least one of the scanning confidence value, the extraction confidence value, the calculated attribute confidence value, the model confidence value, and the loan risk rating.

8. The method of claim 1, further comprising the step of providing a user interface that displays evidence from a loan document that forms the basis for an extracted attribute.

9. The method of claim 8, further comprising the step of enabling the user, through the user interface, to select text in the evidence that is associated with the extracted attribute.

10. The method of claim 1, further comprising the step of enabling the user, through the user interface, to accept a calculated attribute.

11. A computer-implemented system for automated grading of a loan with chained confidence scoring that represents an aggregated confidence value of a plurality of tasks and corresponding confidence values in a loan determination, the system comprising:
a memory; and
a computer processor that is programmed to:
electronically scan a plurality of documents within a credit file for the loan; and generate at least one scanning confidence value that represents that a corresponding electronic scanning task has been performed correctly;
electronically extract a plurality of attributes from the scanned plurality of documents; and generate at least one extraction confidence value that represents that a corresponding electronic extracting task has been performed correctly wherein the at least one extraction confidence value is based on at least one of: a determination of variance of extracted values, document type accuracy, and a resolution strategy accuracy;
calculate a plurality of calculated attributes based on the extracted attributes; and generate a calculated attribute confidence value that represents that a corresponding attribute calculating task has been performed correctly wherein the calculated attribute confidence value is based on normalizing and resolving at least one of: input attributes and calculated attributes;
calculate a loan risk rating based on the calculated attributes and the extracted attributes; and generate a model confidence value associated with the calculated loan risk rating wherein the model confidence value represents a measure of accuracy of a corresponding model's performance;
enable a user, through an interactive user interface, to modify at least one of: the scanning confidence value, the extraction confidence value, the calculated attribute confidence value, the model confidence value, and the loan risk rating, wherein the interactive user interface is communicatively coupled to the computer processor to provide optimized weights applied to each of the confidence values;
train, by the computer processor using a machine learning algorithm, a chained confidence model using the modified at least one of the scanning confidence value, the extraction confidence value, the calculated attribute confidence value, the model confidence value, and the loan risk rating as collective training data from multiple sources of loan data, wherein the training employs the machine learning algorithm to grade the confidence of the chained confidence model and improve the chained confidence model;
calculate, using the chained confidence model, an overall loan grade confidence value for an automated grading of a loan, the overall loan grade confidence value represents an aggregated confidence value based on a combination of: the scanning confidence value, the extraction confidence value, the calculated attribute confidence value, the model confidence value, and the loan risk rating;
enable, by the interactive interface, a loan auditor to grade the overall loan grade confidence value and provide a basis for the loan auditor grade; and
improve the machine learning algorithm by using the loan auditor grade and basis for that grade as feedback into the machine learning algorithm.

12. The system of claim 11, wherein the computer processor is further programmed to automatically accept the calculated loan risk rating if the calculated overall loan grade confidence value is above a predetermined value.

13. The system of claim 11, wherein the credit file for the loan further includes a plurality of electronic documents that have not been scanned, and the computer processor is further programmed to electronically extract a plurality of attributes from the plurality of electronic documents.

14. The system of claim 13, wherein the computer processor is programmed to apply natural language processing to the scanned documents and to the electronic documents.

15. The system of claim 11, wherein the computer process is further programmed to extract at least one attribute from a table.

16. The system of claim 11, wherein, in connection with electronically extracting a plurality of attributes, the computer processor is further programmed to normalize a plurality of values to a single format and resolve a plurality of values to a single value.

17. The system of claim 11, wherein the computer processor is further programmed to calculate a weight for at least one of the scanning confidence value, the extraction confidence value, the calculated attribute confidence value, the model confidence value, and the loan risk rating during the training of the chained confidence model.

18. The system of claim 11, wherein the computer processor is further programmed to provide a user interface via a display that displays evidence from a loan document forming the basis for an attribute value.

19. The system of claim 18, wherein the computer process is further programmed to enable the user, through the user interface, to select text in the evidence that is associated with the attribute.

20. The system of claim 11, wherein the computer processor is further programmed to enable the user, through the user interface, to accept a calculated attribute.

* * * * *

UNITED STATES PATENT AND TRADEMARK OFFICE
CERTIFICATE OF CORRECTION

PATENT NO. : 11,010,832 B2
APPLICATION NO. : 15/977636
DATED : May 18, 2021
INVENTOR(S) : Matthew Thomas Ardinger et al.

Page 1 of 1

It is certified that error appears in the above-identified patent and that said Letters Patent is hereby corrected as shown below:

In the Claims

In Claim 1, Column 14, Line 45, amend "the modified at least one of the scanning confidence" to --the modified at least one of: the scanning confidence--

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*